Patented Mar. 15, 1932

1,850,037

UNITED STATES PATENT OFFICE

SAMUEL F. STICKELL, OF BROOKLYN, NEW YORK, AND JOHN R. POOLE, OF HINGHAM, MASSACHUSETTS

PROCESS OF MAKING CREAMED PRODUCTS

No Drawing.    Application filed October 22, 1929.    Serial No. 401,611.

This invention relates to a creamed product and a method of making the same.

Attempts have been made to can products such as vegetables or meat having a sauce so that the product is known as creamed materials. It has not been possible in the past, however, to produce a product of the proper consistency or one that will have lasting qualities since the creamed products deteriorate after a short period and are therefore unmarketable. Deterioration of the products causes them to become unpalatable.

It is an object of the present invention to produce a product by an improved process, whereby the canned creamed material will keep indefinitely and at all times having a palatable flavor and retaining its original form.

A further object of the invention is the provision of a process for producing a sauce to be applied to vegetables, meats or fish and which may be readily served after the application of sufficient heat.

A still further object of the invention is the provision of a product having incorporated therein a sauce in such a manner that the materials, such as fish, meats, and vegetables will retain their flavors and palatable appearance in the original form.

This invention will be best understood from a consideration of the following detailed description forming part of the specification; nevertheless, it is to be understood that the invention is not confined to the disclosure, being susceptible of such changes and modifications which shall define no material departure from the salient features of the invention as expressed in the appended claims.

In carrying out the process for the production of canned creamed products, whole milk to the extent of 93% and containing 3.5% butter fat is employed in connection with cream corn starch, 5%; cocoanut oil 1½%; sodium chloride ½ of 1% and a fraction of a percent of pepper. The quantity of the condiment depends upon the flavor desired.

The milk is first pasteurized to which is added the starch and these ingredients are continuously agitated until a uniform cream-like solution is obtained. These materials are mixed at atmospheric temperature and heated to approximately 100° F.

At this time, it is necessary to consider the materials to which the sauce is to be applied. The meat, fish, vegetables or poultry are cooked sufficiently and the liquor from these materials is then withdrawn and added to the cream-like solution.

The cocoanut oil, pepper, and sodium chloride are added to the above mixture while at a temperature of approximately 100° F. and the resultant product is heated to a temperature of approximately 160° F. and homogenized at a pressure of 3500 pounds during the first stage and at 1500 pounds the second stage. These consecutive pressures during the last-named step of the process are intended to produce a homogeneous solution and increase the viscosity and act to prevent separation of the ingredients after sterilization.

The purpose of raising the temperature of the materials 160° F. is to cause coagulation of the albumins so that when said materials are run through the homogenizer the coagulated albumins will be broken up into minute particles.

Immediately before the canning operation is performed, a sufficient quantity of bicarbonate of soda is added to the mixture so that the pH reading will be approximately 6.5 to 6.7 depending upon the stabilizing properties of the milk. Care must be exercised to prevent coagulation of the milk with other materials during and following sterilizing.

When it is intended to cream codfish or smoked and salted finnan haddie for canning purposes as described above, the fish meat is soaked in water for approximately 12 hours at a predetermined temperature so that the salt will be removed from the fish meat. This water is then drained from the meat after which it is shredded or cut into cubes or small pieces and cooked at a boiling temperature for approximately 10 minutes in water with the fish being only partially immersed in the water. After the boiling operation, the liquid amount approximately one-half to one pint to each pound of meat cooked, is withdrawn and used in the manner described above in connection with the preparation of the sauce.

When chipped beef is employed, it is boiled for approximately ten minutes and the meat liquor approximately one and one-half to 1 pint to each pound of meat is withdrawn and utilized in the preparation of the sauce. In completing the process of canning the chipped beef, 95 pounds of the sauce is mixed with 15 pounds of beef. The proportionate quantity of liquor from the meat having been previously utilized in the sauce.

In the preparation of the fish, 30 pounds of the fish meat is added to 90 pounds of sauce. In either case, the materials containing the sauce and the meat are placed in the containers and sterilized in an agitating sterilizer at a temperature of 240° F. for approximately 20 minutes.

In the preparation of creamed vegetables, the sauce is prepared in a similar manner and the liquor employed in cooking the vegetables is returned to the sauce before the homogenizing process. These vegetables are boiled a sufficient time to make them readily digestible and eighty (80) parts of the sauce are applied to thirty (30) parts of the vegetables in mass quantity and agitated, and sterilized at approximately 240° F. for 20 minutes.

When poultry meat is employed, it is cooked in the usual manner until it is edible in as small a quantity of water as will be practical and the sauce is formed in the manner described above and applied to the meat. These creamed materials are placed in air tight cans and sterilized after canning.

We claim:

1. The method of preparing creamed products for canning which comprises cooking a food material in a limited quantity of water, removing the broth from the cooked materials intimately mixing at atmospheric temperature 93 parts of milk and 5 parts of corn starch to form a cream-like liquid, raising the temperature of the liquid to approximately 100° F., then adding the broth from the cooked materials, cocoanut oil, pepper and sodium chloride to the cream-like liquid, raising the temperature of the total mixture to approximately 160° F. and homogenizing the mixture in two successive stages having pressures of approximately 3500 pounds and 1500 pounds respectively while maintaining the temperature of the mixture of 160° F., then after the homogenizing step incorporating a small quantity of bicarbonate of soda in the homogenized product, and adding the cooked materials.

2. The method of preparing creamed products for canning which comprises cooking a food material in a limited quantity of water, intimately mixing milk and corn starch until the mixture is of a cream-like consistency, heating the mixture until the temperature approximates 100° F., thoroughly stirring the broth from the cooked materials together with cocoanut oil, pepper and sodium chloride into the mixture raising the temperature of the last mixture to approximately 160° F., homogenizing the mixture while maintaining the temperature thereof at approximately 160° F., then incorporating a small quantity of sodium bicarbonate into the mixture, and adding the cooked materials.

3. The method of preparing creamed products for canning which comprises cooking a food material in a limited quantity of water, intimately mixing milk and corn starch until the mixture is of a cream-like consistency, heating the mixture until the temperature approximates 100° F., thoroughly stirring the broth from the cooked materials together with cocoanut oil, pepper and sodium chloride into the mixture, raising the temperature of the last mixture to approximately 160° F., homogenizing the mixture while maintaining the temperature thereof at approximately 160° F., then incorporating a small quantity of sodium bicarbonate into the mixture, and adding the cooked materials, then sterilizing the resulting product at a temperature of approximately 240° F.

4. The method of preparing creamed products for canning which comprises cooking a food material in a limited quantity of water, intimately mixing milk and corn starch until the mixture is of a cream-like consistency, heating the mixture until the temperature approximates 100° F., thoroughly stirring the broth from the cooked materials together with cocoanut oil into the mixture, raising the temperature of the last mixture to approximately 160° F., homogenizing the mixture while maintaining the temperature thereof at approximately 160° F., and adding the cooked materials.

5. The method of preparing creamed products for canning which comprises cooking a food material in a limited quantity of water, removing the broth from the cooked materials, intimately mixing at atmospheric temperature 93 parts of milk and 5 parts of corn starch to form a cream-like liquid, raising the temperature of the liquid to approximately 100° F. then adding the broth from the cooked materials and cocoanut oil to the cream-like liquid, raising the temperature of the last named mixture to approximately 160° F. and homogenizing the mixture in two successive stages having pressures of approximately 3500 pounds and 1500 pounds respectively, while maintaining the temperature of the mixture at 160° F., then after the homogenizing step incorporating a small quantity of bicarbonate of soda in the homogenized product, and adding the cooked materials.

6. The method of preparing creamed products for canning which comprises cooking a food material in a limited quantity of water, removing the broth from the cooked materials, intimately mixing at atmospheric temperature 93 parts of milk and 5 parts of corn starch to form a cream-like liquid, raising the temperature of the liquid to approximately 100° F., then adding the broth from the cooked materials, cocoanut oil, pepper and sodium chloride to the cream-like liquid, raising the temperature of the last named mixture to approximately 160° F. and homogenizing the mixture in two successive stages while maintaining the temperature of the mixture at 160° F., then after the homogenizing step incorporating a small quantity of bicarbonate of soda in the homogenized product, and adding the cooked materials.

7. The method of preparing creamed products for canning which comprises cooking a food material in a limited quantity of water, removing the broth from the cooked materials, intimately mixing at atmospheric temperature 93 parts of milk and 5 parts of corn starch to form a cream-like liquid, raising the temperature of the liquid to approximately 100° F., then adding the broth from the cooked materials and cocoanut oil, to the cream-like liquid, raising the temperature of the last named mixture to approximately 160° F., and homogenizing the mixture in two successive stages while maintaining the temperature of the mixture at 160° F., then after the homogenizing step incorporating a small quantity of bicarbonate of soda in the homogenized product, and adding the cooked materials.

SAMUEL F. STICKELL.
JOHN R. POOLE.